United States Patent Office 3,374,093

Patented Mar. 19, 1968

3,374,093
METHOD OF FORMING A SOLDER MATERIAL

Victor J. King, Mountain View, Calif., assignor to Lockheed Aircraft Corporation, Burbank, Calif.

No Drawing. Continuation of application Ser. No. 434,095, Feb. 19, 1965. This application Apr. 21, 1966, Ser. No. 544,121

2 Claims. (Cl. 75—135)

ABSTRACT OF THE DISCLOSURE

Method of making solder alloy compositions of thallium-indium-mercury which comprises, producing a solid phase in a liquid phase and then decanting said liquid phase.

This application is a continuation of U.S. application Ser. No. 434,095, filed Feb. 19, 1965, now abandoned, which application was in turn a continuation-in-part of U.S. application Ser. No. 196,481, filed May 21, 1962, now abandoned.

The preferred alloys which can be formed from thallium, indium and mercury possess unique characteristics which permit the joining of metallic as well as non-metallic materials such as refractories, semiconductors, glass, plastic and fabrics.

One of the most critical problems in the art of manufacturing semiconductive devices concerns the attachment of terminal leads to the exterior surface of a semiconductor body. Hot soldering of the terminal leads to the semiconductor body frequently results in damage to the operating characteristics of the semiconductive unit. Other approaches to joining, such as spot welding, or pressure welding, likewise induce physical damage. Any technique which produces excessive heat risks a composition or phase change in the semiconductive material which will destroy its utility for its intended application.

In general, the instant invention may be practiced to permit the joining of terminal leads to semiconductive bodies without altering the physical and chemical structure of said semiconductive bodies to the point that the operating characteristics of the device are seriously impaired. The instant invention contemplates the use of an alloy which will effect sound electrical connections between the terminal leads and the surface of the semiconductor electrodes, namely, the base electrodes, emitter electrodes and collector electrodes. This is accomplished by applying an absolute minimum of pressure and heat to the semiconductive body during the process of joining. For example, when only temporary contacts are needed for testing and evaluating a semiconductor device, a physically strong electrical joint is unnecessary and, indeed, wholly undesirable since in many instances unsoldering is required at the completion of the test; consequently, liquid solder is what is needed in such instances. In cases where a semiconductor device will be exposed to very little physical strain, the use of high-temperature solders to form exceedingly strong joints is unnecessary and simply exposes the device to the unnecessary risk of overheating; therefore, utilization of a low temperature solder which forms a joint of adequate strength is more realistic in such circumstances. However, in the event strong joints are required it is imperative that when a high temperature solder is used that the quantity of heat transmitted to the semiconductor during the joining process be kept to an absolute minimum; consequently, a pre-tinning alloy which will permit joining of terminal leads to the semiconductive body by merely applying a drop of high-temperature solder without actually applying a soldering iron to the semiconductor surface to sweat in the leads is highly desirable.

The alloys of the present invention are capable of being adjusted in composition to perform all of the above-mentioned functions and, moreover, provide joints of exceedingly low contact resistance. To wit, the preferred alloys of the present invention can be made to form: a liquid, low-resistance alloy for temporarily connecting terminal leads to semiconductive bodies; a solid alloy for low-temperature soldering to form permanent joints; and a liquid pre-tinning alloy of unusual wetting tendencies whereby soldering with high-strength, high-temperature solders is facilitated because unwarranted application of heat to the semiconductor body is avoided. The preparation of a liquid or solid alloy of the present invention for the above-mentioned specific applications will be hereinafter set forth in detail.

An object of the present invention is, therefore, to provide an alloy which can be applied to metallic as well as non-metallic materials.

A further object of the invention is to produce alloys which can be applied to metals as well as non-metals and will exhibit excellent adhesion characteristics.

Still another object is to produce an alloy which at room temperature forms a liquid of low electrical resistivity suitable for temporary joining of metallic as well as non-metallic materials.

Yet another object is to provide an alloy which at room temperature forms a solid of low electrical resistivity suitable for permanently joining metallic as well as non-metallic materials.

Another object is to provide an alloy which at room temperature will form a liquid exhibiting unusual wetting tendencies on metallic and non-metallic surfaces.

Another object is to provide an alloy of low ohmic contact resistance suitable for joining terminal leads to the surface of semiconductive electrodes and other electronic components made of metallic or non-metallic materials.

These objects of the invention are accomplished by providing an alloy comprised of thallium containing either or both indium and mercury. It was discovered in the development of the instant invention that alloys of thallium and indium could be made which would produce joints of suitable contact conductivity and strength; and likewise alloys of mercury and thallium resulted in reasonably good joints insofar as electrical and physical characteristics were concerned. However, for most applications it is usually preferred to form a ternary alloy of thallium, indium and mercury. In this way, it was found that the most remarkable and unexpected results of the instant invention resulted. It was discovered that an alloy could be formed in which the resultant liquid phase, when applied to an N or P type lead telluride semiconductor, exhibited unusual wetting tendencies as well as a contact resistance in the order of $3\times10^{-5}$ ohms/cm.$^2$ or less. The alloy in the liquid form can be used, for example, for temporary contacts that can be achieved by touch, by pressure, or rubbing of the semiconductor surface with an alloy of preferred composition. It has been found that surface preparation in most cases is unnecessary as light oxide surface coatings on the semiconductor did not inhibit the wetting action of the preferred alloys. Although the exact reason for this is not known, it is believed that this is the result of the natural affinity which thallium has for oxygen. Consequently, by application of the present alloys to a body, any oxide film which is present is broken down and physically detached from the semiconductor surface. With surface impurities out of the way the alloy is in direct contact with bare material whereby the attraction between the surface atoms of the semiconductor body and the individual atoms of thallium, indium and mercury in the alloy is greater than the interatomic attraction between these independent atoms in the alloy itself.

The alloy is then in intimate contact with the semiconductor surface whose surface atoms may now exert maximum attraction thereby off-balancing the surface tension of the thallium-indium-mercury alloy. The classical explanation of surface tension postulates that within the body of a liquid an atom is acted upon by atoms which are distributed more or less symmetrically about the atom except at the surface. There the atom is only partially surrounded by other atoms, and, as a consequence, it experiences only an attraction towards the body of the liquid. This latter attraction tends to draw the surface atoms inward, and in so doing makes the liquid behave as if it were surrounded by an invisible membrane. However, when the liquid body is placed in contact with a dissimilar substance, an interface is formed where the inequalities of atomic attraction tend to change the shape of the interface.

When the liquid alloys of the present invention are placed on the surface of a dissimilar substance such as a metallic or non-metallic body, the cohesive atomic attraction is substantially greater than the adhesive atomic attraction between the atoms in the alloy. More specifically, when the instant alloy is present in liquid form on a semiconductive surface, the interatomic attraction between the surface atoms of the semiconductor and the atoms in the alloy exceeds the inter-atomic attraction between the atoms of the indium, thallium, and mercury in the alloy itself. Consequently, substantially complete wettability is effected in much the same way that oil completely wets the surface of clean metals.

Likewise, just as the liquid alloys exhibit unusual wetting characteristics, the solid alloys of the present invention, when heated to above their respective melting points, evidence unique capabilities for wetting metals and nonmetallics.

Although the foregoing hypothetical discussion is believed to explain the phenonemon of unique wettability in the alloys of the present invention, it is in no way intended that the invention herein described is to be so limited.

To produce a typical preferred liquid composition of the instant invention, a mixture of 33 atomic percent mercury, 20 atomic percent thallium and 47 atomic percent indium is heated to 300° C. to produce a single-phase liquid. The alloy is then cooled to room temperature, whereupon a solid phase will separate out of the solution. The remaining liquid phase in equilibrium with the solid phase at room temperature can then be decanted and used for making temporary or easily "broken" liquid contacts. Also, the liquid solder can be employed for the purpose of pretinning surfaces in preparation for high-temperature soldering.

The residue solid phase thus produced can, of course, be used as a solid solder. However, since at room temperature it would be on the verge of melting, it would have low physical strength. It is preferred, therefore, to decant the liquid at a temperature somewhat above room temperature to produce an alloy suitable for producing permanent joints. For example, if a terminal lead is to be joined to the electrodes of a semiconductor which cannot be safely heated for prolonged periods to above 140° C., the liquid-solid slurry should be decanted at a temperature somewhat above 140° C., for example, 200° C. In this way a solid solder will be produced which will not undergo incipient fusion even though the semiconductor approaches the 140° C. limit.

The above method of producing alloys of the instant invention will necessarily result in solders which will approximate the compositions of the liquidus surface as depicted by the isotherms of a Ti-In-Hg ternary isomorphous phase diagram. However, the preferred ranges of composition of the alloys of the present invention are not to be construed to be limited in such a manner. The desirable properties of wettability and high electrical conductivity can be achieved in many other possible combinations of the three components, thallium, indium and mercury.

As pointed out hereinabove, suitable binary alloys comprised of either thallium and mercury or thallium and indium can be produced which will exhibit suitable properties for many applications. However, when all three elements are added together to form a ternary alloy it is then that the unique desirable wetting characteristics are maximized.

In preparing a binary alloy from the thallium and indium alone to produce a preferred embodiment of the present invention, thallium must be present from between the limits of 0.1 to 60 atomic percent and indium must be present in the range of from 40 to 99.9 atomic percent. To produce preferred embodiments of the thallium-mercury binary alloy it is necessary that thallium be present in the range from 0.1 to 55 atomic percent and mercury must be present in the range from 45 to 99.9 atomic percent. In the first binary comprised of thallium and indium, the resultant solder will be a solid. In the latter, however, when the mercury is a predominant component, the thallium and mercury form a liquid alloy suitable for temporary contacts or pre-tinning.

Although it would seem that the binary of indium and mercury would also form suitable alloys for purposes of the present invention, it was found that a pure binary of indium and mercury without at least 0.1 of thallium would not achieve the desired results. From this it is seen that thallium is an essential ingredient in any of the preferred alloys of the present invention whether it be of the binary or ternary class. To produce a ternary utilizing a minimum of thallium, it is necessary to add at least 0.1 atomic percent thallium to the binary of indium and mercury which, preferably, consist of from 10 to 99.9 atomic percent mercury and of 0 to 90 atomic percent indium. The maximum thallium, as pointed out above, would be less than 60 atomic percent. Pure thallium alone does not possess the wetting characteristics desired for the instant invention.

From the above description of the limits of the preferred alloys in the present invention, one is now capable of making a virtually unlimited number of specific alloys which are either a binary of thallium and indium or thallium and mercury or a ternary of thallium, indium and mercury, for example, at least 0.1 atomic percent thallium, at least 10 atomic percent mercury with the balance being indium, and at least 0.1 atomic percent thallium, from 40 to 99.9 atomic percent indium and from 45 to 99.9 atomic percent mercury. Whether or not the resultant alloy will be of the liquid or solid variety depends on the proportion of mercury employed. By using large quantities of mercury it is possible to produce a ternary alloy possessing exceptional wetting characteristics and low electrical resistivity which will remain in the liquid condition to temperatures as low as −35° C. When the solid solder is being made it is desirable to avoid the formation of intermetallic compounds in the alloy, which, by their nature, tend to impart undesirable physical characteristics to the metal matrix.

As pointed out hereinabove, preferred alloys of the present invention must containe thallium of at least 0.1 atomic percent. Increasing the thallium content to any point within the ranges set forth hereinabove will, in general, increase the wettability of the resultant alloy. No sharp point of demarcation has been observed in increasing the thallium from the very low quantities. Instead a very gradual improvement in wetting capability is observed, up to a point, by gradually increasing the thallium content of the preferred alloys of this invention. In general, however, it is preferable that a ternary composition be produced which will contain from 5 to 25 atomic percent thallium with the balance being mercury and indium. A typical preferred composition of the instant invention consists of 20 percent thallium, 50 percent indium and 30 percent mercury. This composition produces a liquid alloy capable of readily wetting metals, glasses, plastics, refractories or semiconductors. For example, a piece of alumina which is lightly brushed with a few drops of the alloy of this composition is thoroughly and instantly wetted where contacted. Then, in order to solder a wire to the piece of alumina, it is preferred to preheat the alumina to 150° C., lay the piece of pre-tinned copper wire in contact with the wetted surface, drop a globule of molten commercial solder on the area where the wire contacts the pre-tinned alumina, and allow the joined parts to cool down to room temperature. The joint between a 0.020" diameter wire and a plate of alumina which has been formed by this process can withstand a stress of up to 20,000 pounds per square inch. Another preferred composition of the invention consists of 35.6% mercury, 56.4% indium and 8% thallium.

Due to the unique wettability of the alloys herein described, a needle can be dipped into an alloy of the liquid variety and fine lines drawn therewith on both metallic and non-metallic surfaces. For example, by drawing a line on a nonconductive substrate with the liquid composition of the present invention, an electrical circuit can be laid down. Placing the thus inscribed substrate in a heated vacuum environment will volatilize apart the mercury and thallium thereby leaving intact a metallic electrical circuit.

By providing a non-conductive substrate with connector pins and drawing lines across said substrate between the pins with the liquid alloys of the present invention, it is possible for a patchboard programmer in the computer art to perform all necessary patchwork at his desk. That is, immediately after calculating which connector pins must be joined for proper patching, he can draw a line with liquid alloys of the present invention between the appropriate pins. Then, by hardening the alloys through a vacuum treatment, the board can be plugged into the computer to cause the necessary interconnection of electronic units in the computer console. In the present state of the art many man-hours are required to connect the patchcords to a patchboard for proper programming; and with the result of many costly errors due to the manual difficulty of the task.

Another application of the liquid alloys of the present invention is in the production of low cost printed circuits. One can print a circuit with the liquid directly on a non-conductive substrate to form a complete printed circuit upon vacuum treatment. Circuits so produced are thereby manufactured by a simple two-step process which is substantially simpler than the present photographic technique used in the printed circuit art.

It has been found that it is possible to add small quantities of other elements to the preferred alloys hereinabove described in order to slightly alter the melting point, the electrical conductivity, or wetting characteristics of a specific formulation. Two compatible additives which have proven successful in this regard are galium and bismuth. Either can be added to the basic alloy in relatively small quantities to adjust the above mentioned properties.

It should be understood, therefore, that the foregoing disclosure relates only to the preferred embodiments of the invention and that numerous modifications or alterations may be made therein without departing from the spirit and scope of the invention as set forth in the appended claims.

Having thus described my invention, What I claim is:

1. The method of forming a solder material comprising the steps of:

(a) forming a mixture of approximately 33 atomic percent mercury, approximately 20 atomic percent thallium, and approximately 47 atomic percent indium;

(b) heating said mixture to approximately 300° C. to produce a single phase liquid;

(c) cooling said liquid to room temperature to produce a solid phase in said liquid;

(d) permitting said solid phase to settle out of said liquid;

(e) and decanting said liquid from said solid phase.

2. The method of forming a solder material comprising the steps of:

(a) forming a mixture of approximately 33 atomic percent mercury, approximately 20 atomic percent thallium, and approximately 47 atomic percent indium;

(b) heating said mixture to approximately 300° C.;

(c) cooling said mixture to between approximately 140° C. and approximately 200° C. to produce a solid phase in said liquid;

(d) and decanting said liquid from said solid phase at a temperature between approximately 140° C. and approximately 200° C.

References Cited

UNITED STATES PATENTS 3,087,811 4/1963 Freeberg ---------- 75—169

FOREIGN PATENTS 1,242,981 8/1960 France.

HYLAND BIZOT, *Primary Examiner.*

RICHARD O. DEAN, *Examiner.*